United States Patent
Islam et al.

(10) Patent No.: US 11,792,750 B2
(45) Date of Patent: Oct. 17, 2023

(54) REFERENCE TIMING FOR MULTIPLE TRANSMISSION AND RECEPTION POINTS IN MULTI-RADIO DUAL CONNECTIVITY

(71) Applicant: QUALCOMM Incorporated, San Diego, CA (US)

(72) Inventors: Muhammad Nazmul Islam, Littleton, MA (US); Mostafa Khoshnevisan, San Diego, CA (US); Yuanning Yu, Santa Clara, CA (US); Valentin Alexandru Gheorghiu, Yokohama (JP); Arash Mirbagheri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 17/317,748

(22) Filed: May 11, 2021

(65) Prior Publication Data
US 2021/0360554 A1 Nov. 18, 2021

Related U.S. Application Data

(60) Provisional application No. 63/025,950, filed on May 15, 2020.

(51) Int. Cl.
*H04W 56/00* (2009.01)
*H04L 5/00* (2006.01)

(52) U.S. Cl.
CPC ......... *H04W 56/0005* (2013.01); *H04L 5/001* (2013.01); *H04W 56/0015* (2013.01)

(58) Field of Classification Search
CPC ..... H04L 1/0001; H04L 5/001; H04L 5/0035; H04L 5/0048; H04W 56/0005; H04W 56/0055; H04W 56/0015; H04W 56/001
See application file for complete search history.

(56) References Cited

U.S. PATENT DOCUMENTS 10,153,871 B2 * 12/2018 Dinan .................... H04L 5/0007
10,455,603 B2 * 10/2019 Hosseini ........... H04W 56/0045
(Continued)

FOREIGN PATENT DOCUMENTS

| WO | WO-2012042736 A1 * | 4/2012 | ............. H04L 5/001 |
| WO | 2018145083 A1 | 9/2018 | |
| WO | WO-2020155849 A1 * | 8/2020 | ............. H04B 7/024 |

OTHER PUBLICATIONS

Apple, "On MRTD requirement for FR2 inter-band CA", 3GPP TSG-RAN4 Meeting #94-e Online, Feb. 24, 2020-Mar. 6, 2020, R4-2000786, Total pp. 5 (Year: 2020).*
(Continued)

*Primary Examiner* — Shah M Rahman
(74) *Attorney, Agent, or Firm* — Shumaker & Sieffert, P. A.

(57) ABSTRACT

Aspects of the disclosure relate to a wireless user equipment (UE) establishing and utilizing a reference timing for a carrier or cell with multiple transmission and reception points (TRPs). A UE may receive a downlink signal on each of a plurality of component carriers (CCs), and determine respective timing events (e.g., slot boundaries, subframe boundaries, etc.) corresponding to each of the plurality of CCs. The UE may then determine a reference time for a first CC of the plurality of CCs. This reference time corresponds to a function of two or more timing events corresponding to different TRPs utilizing the first CC. The UE then determines a relative timing difference between the plurality of CCs based on this determined reference time. Other aspects, embodiments, and features are also claimed and described, including determining and utilizing a reference time on an uplink CC.

15 Claims, 8 Drawing Sheets

(56) References Cited

U.S. PATENT DOCUMENTS

| | | | |
|---|---|---|---|
| 10,630,517 B2* | 4/2020 | Yang | H04W 56/0045 370/336 |
| 2012/0120821 A1* | 5/2012 | Kazmi | H04W 56/0045 370/336 |
| 2013/0121316 A1* | 5/2013 | Skov | H04W 72/0446 370/336 |
| 2013/0250925 A1* | 9/2013 | Lohr | H04W 36/30 370/336 |
| 2014/0010163 A1* | 1/2014 | Dinan | H04L 27/2692 370/328 |
| 2014/0029586 A1* | 1/2014 | Loehr | H04W 56/0005 370/336 |
| 2018/0146444 A1* | 5/2018 | Chen | H04J 11/0053 |
| 2018/0255569 A1* | 9/2018 | Aiba | H04L 5/001 |
| 2019/0141697 A1* | 5/2019 | Islam | H04L 5/0094 |
| 2019/0254060 A1* | 8/2019 | Li | H04L 5/0055 |
| 2019/0306923 A1* | 10/2019 | Xiong | H04L 27/261 |
| 2020/0145947 A1 | 5/2020 | Gheorghiu et al. | |
| 2020/0382978 A1* | 12/2020 | Manolakos | G01S 5/0236 |
| 2021/0314888 A1* | 10/2021 | Rahman | H04W 56/004 |
| 2021/0351861 A1* | 11/2021 | Nimbalker | H04L 1/0016 |
| 2021/0352629 A1* | 11/2021 | Haghighat | H04L 5/0096 |
| 2021/0410094 A1* | 12/2021 | Cui | H04W 56/0055 |
| 2022/0174636 A1* | 6/2022 | Liu | H04W 56/0045 |
| 2022/0286992 A1* | 9/2022 | Small | G01S 1/024 |
| 2023/0006727 A1* | 1/2023 | Jang | H04L 5/0051 |
| 2023/0036989 A1* | 2/2023 | Jöngren | H04W 56/001 |

OTHER PUBLICATIONS

International Search Report and Written Opinion—PCT/US2021/032050—ISAEPO—dated Sep. 9, 2021.

Samsung, "Discussion on Multi-TRP/Panel Transmission on MRTD /MTTD" 3GPP TSG-RAN WG4 Meeting #94-e-Bis, Electronic Meeting, Apr. 2020.

Mediatek Inc: "Discussion on MRTD for multiple TRPs scenario", 3GPP TSG-RAN WG3 Meeting #94-e-bis, Electronic Meeting, Apr. 2020.

* cited by examiner

REFERENCE TIMING FOR MULTIPLE TRANSMISSION AND RECEPTION POINTS IN MULTI-RADIO DUAL CONNECTIVITY

CROSS REFERENCE TO RELATED APPLICATIONS

This application claims benefit of the filing date of and priority to US Provisional Patent Application 63/025,950 entitled "Reference Timing for Multiple Transmission and Reception Points in Multi-Radio Dual Connectivity" and filed on May 15, 2020, the disclosure of which is incorporated herein by reference.

INTRODUCTION

In a cellular wireless communication system, end user experience can be improved with a higher data rate, or higher throughput. One straightforward approach to increasing a data rate is by increasing the frequency bandwidth used for communication. Many existing networks achieve an increased bandwidth using one or more multi-carrier approaches, where communications on multiple carriers, whether in the same band or in different bands, can be utilized in parallel. And further, some existing networks enable a multiple carrier configuration where a node can simultaneously communicate over different carriers that utilize different radio access technologies. In various examples, such multi-carrier schemes may be carrier aggregation (CA), dual connectivity (DC), or some other suitable multi-carrier scheme.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In various aspects, the present disclosure relates to a wireless user equipment (UE) establishing and utilizing a reference timing for a carrier or cell with multiple transmission and reception points (TRPs). This reference timing can relieve an ambiguity that may arise in the determination of a timing difference between different component carriers (CCs) when one or more of those CCs utilizes multiple TRPs.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Figure 1:
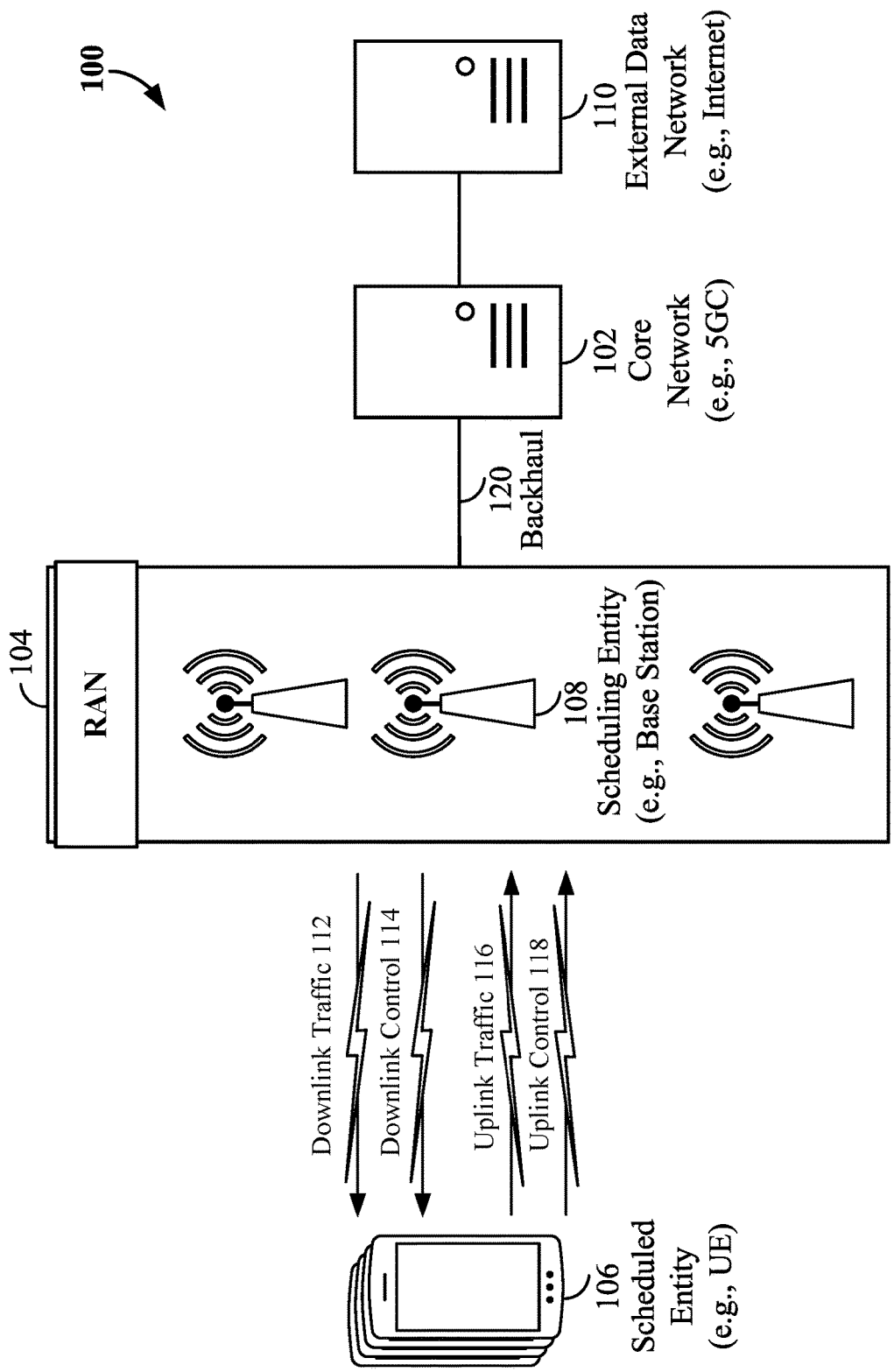
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. The RAN 104 may utilize one or more radio access technologies (RATs) to communicate with the UE 106. Generally, a RAT refers to the type of technology or communication standard utilized for radio access and communication over a wireless air interface. Just a few examples of RATs include GSM, UTRA, E-UTRA (LTE), Bluetooth, and Wi-Fi.

As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eU-TRAN) standards, often referred to as LTE. The 3GPP refers to this hybrid RAN as a next-generation RAN, or NG-RAN. In this example, a UE 106 may be a multimode device, or a device that can provide simultaneous connectivity across different RATs, such as 5G, 4G, Wi-Fi networks, etc. Of course, many other examples of a RAN may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
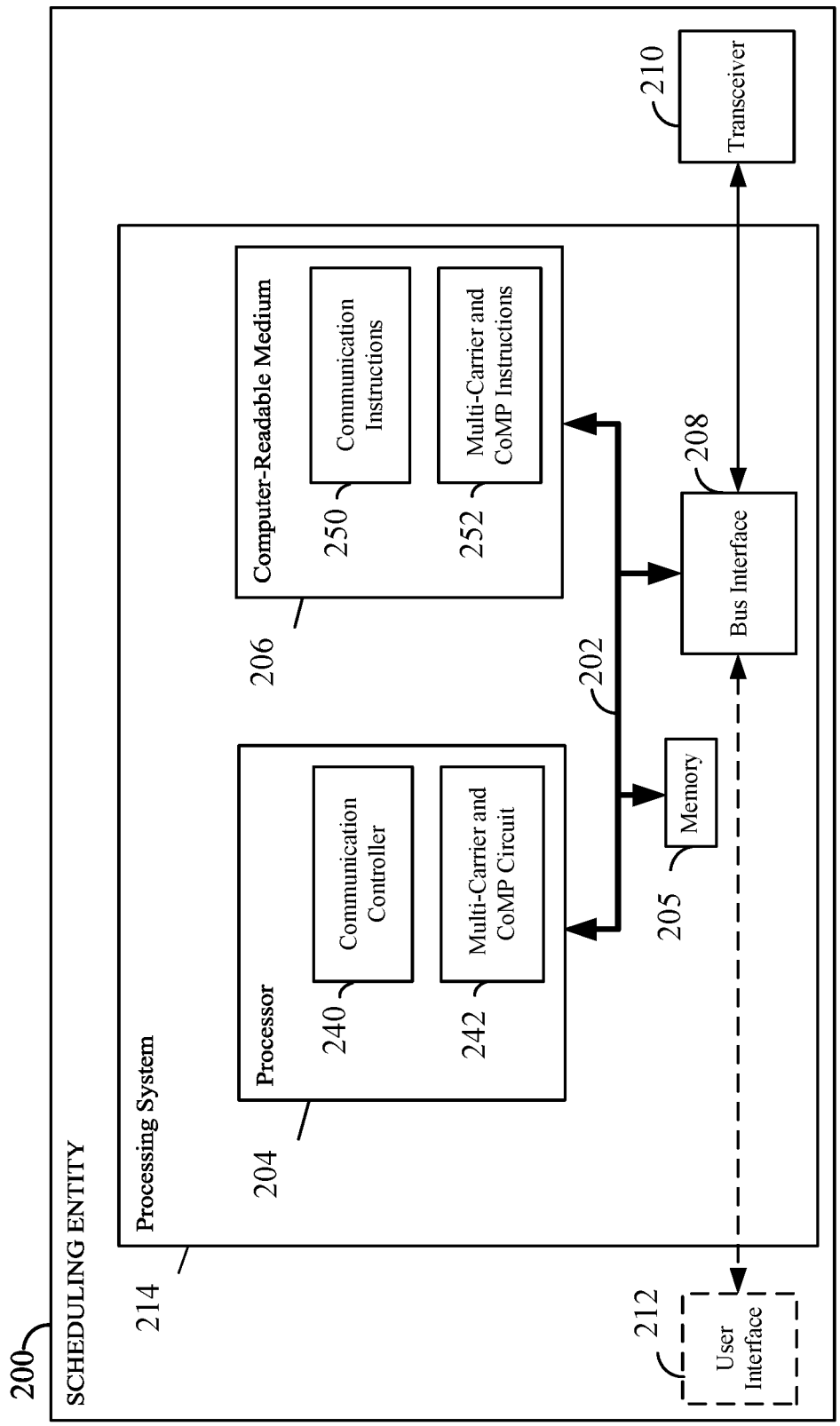
FIG. 2 is a block diagram conceptually illustrating an example of a hardware implementation for a scheduling entity according to some aspects of the disclosure.

FIG. 2 is a block diagram illustrating an example of a hardware implementation for a scheduling entity 200 employing a processing system 214. For example, the scheduling entity 200 may be a user equipment (UE) as illustrated in any one or more of FIGS. 1, 4, 5, and/or 6. In another example, the scheduling entity 200 may be a base station or transmission reception point (TRP) as illustrated in any one or more of FIGS. 1, 4, 5, and/or 6.

The scheduling entity 200 may be implemented with a processing system 214 that includes one or more processors 204. Examples of processors 204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 200 may be configured to perform any one or more of the functions described herein.

In this example, the processing system 214 may be implemented with a bus architecture, represented generally by the bus 202. The bus 202 may include any number of interconnecting buses and bridges depending on the specific application of the processing system 214 and the overall design constraints. The bus 202 communicatively couples together various circuits including one or more processors (represented generally by the processor 204), a memory 205, and computer-readable media (represented generally by the computer-readable medium 206). The bus 202 may also link various other circuits such as timing sources, peripherals, voltage regulators, and power management circuits, which are well known in the art, and therefore, will not be described any further. A bus interface 208 provides an interface between the bus 202 and a transceiver 210. The transceiver 210 provides a communication interface or means for communicating with various other apparatus over a transmission medium. Depending upon the nature of the apparatus, a user interface 212 (e.g., keypad, display, speaker, microphone, joystick) may also be provided. Of course, such a user interface 212 is optional, and may be omitted in some examples, such as a base station.

In some aspects of the disclosure, the processor 204 may include communication circuitry 240 configured for various functions, including, for example, transmitting and/or receiving wireless signals, via the transceiver 210. The processor 204 may further include multi-carrier and coordinated multi-point (CoMP) circuitry 242 configured for various functions, including, for example, establishing and managing a multi-carrier communication scheme such as carrier aggregation and/or dual connectivity.

The processor 204 is responsible for managing the bus 202 and general processing, including the execution of software stored on the computer-readable medium 206. The software, when executed by the processor 204, causes the processing system 214 to perform the various functions described below for any particular apparatus. The computer-readable medium 206 and the memory 205 may also be used for storing data that is manipulated by the processor 204 when executing software.

One or more processors 204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 206. The computer-readable medium 206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 206 may reside in the processing system 214, external to the processing system 214, or distributed across multiple entities including the processing system 214. The computer-readable medium 206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 206 may include communication instructions 250 configured for various functions, including, for example, transmitting and/or receiving wireless signals, via the transceiver 210. The computer-readable storage medium 206 may further include multi-carrier and CoMP instructions 252 configured for various functions, including, for example, establishing and managing a multi-carrier communication scheme such as carrier aggregation and/or dual connectivity.

Figure 3:
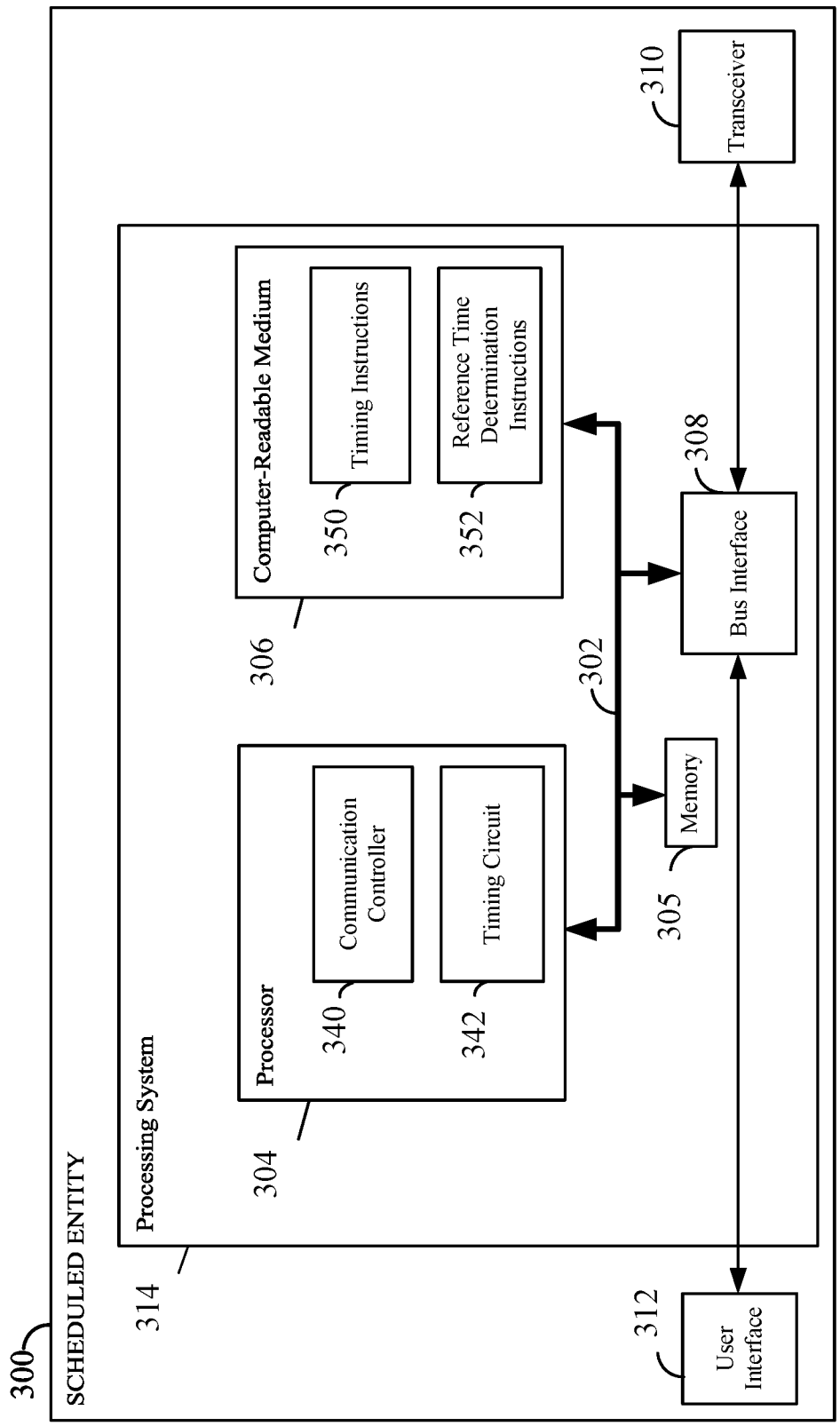
FIG. 3 is a block diagram conceptually illustrating an example of a hardware implementation for a scheduled entity according to some aspects of the disclosure.

FIG. 3 is a conceptual diagram illustrating an example of a hardware implementation for an exemplary scheduled entity 300 employing a processing system 314. In accordance with various aspects of the disclosure, an element, or any portion of an element, or any combination of elements may be implemented with a processing system 314 that includes one or more processors 304. For example, the scheduled entity 300 may be a user equipment (UE) as illustrated in any one or more of FIGS. 1, 4, 5, and/or 6.

The processing system 314 may be substantially the same as the processing system 214 illustrated in FIG. 2, including a bus interface 308, a bus 302, memory 305, a processor 304, and a computer-readable medium 306. Furthermore, the scheduled entity 300 may include a user interface 312 and a transceiver 310 substantially similar to those described above in FIG. 2. That is, the processor 304, as utilized in a scheduled entity 300, may be used to implement any one or more of the processes described below and illustrated in FIGS. 7 and/or 8.

In some aspects of the disclosure, the processor 304 may include timing circuitry 340 configured for various functions, including, for example, determining timing events for one or more carriers or cells. For example, the timing circuitry 340 may be configured to implement one or more of the functions described below in relation to FIGS. 7 and/or 8. The processor 304 may further include reference time determination circuitry 342 configured for various functions, including, for example, determining a reference time for a given carrier or cell, the reference time corresponding to a function of two or more timing events corresponding to different TRPs utilizing that carrier or cell. For example, the reference time determination circuit 342 may be configured to implement one or more of the functions described below in relation to FIGS. 7 and/or 8.

Figure 4:
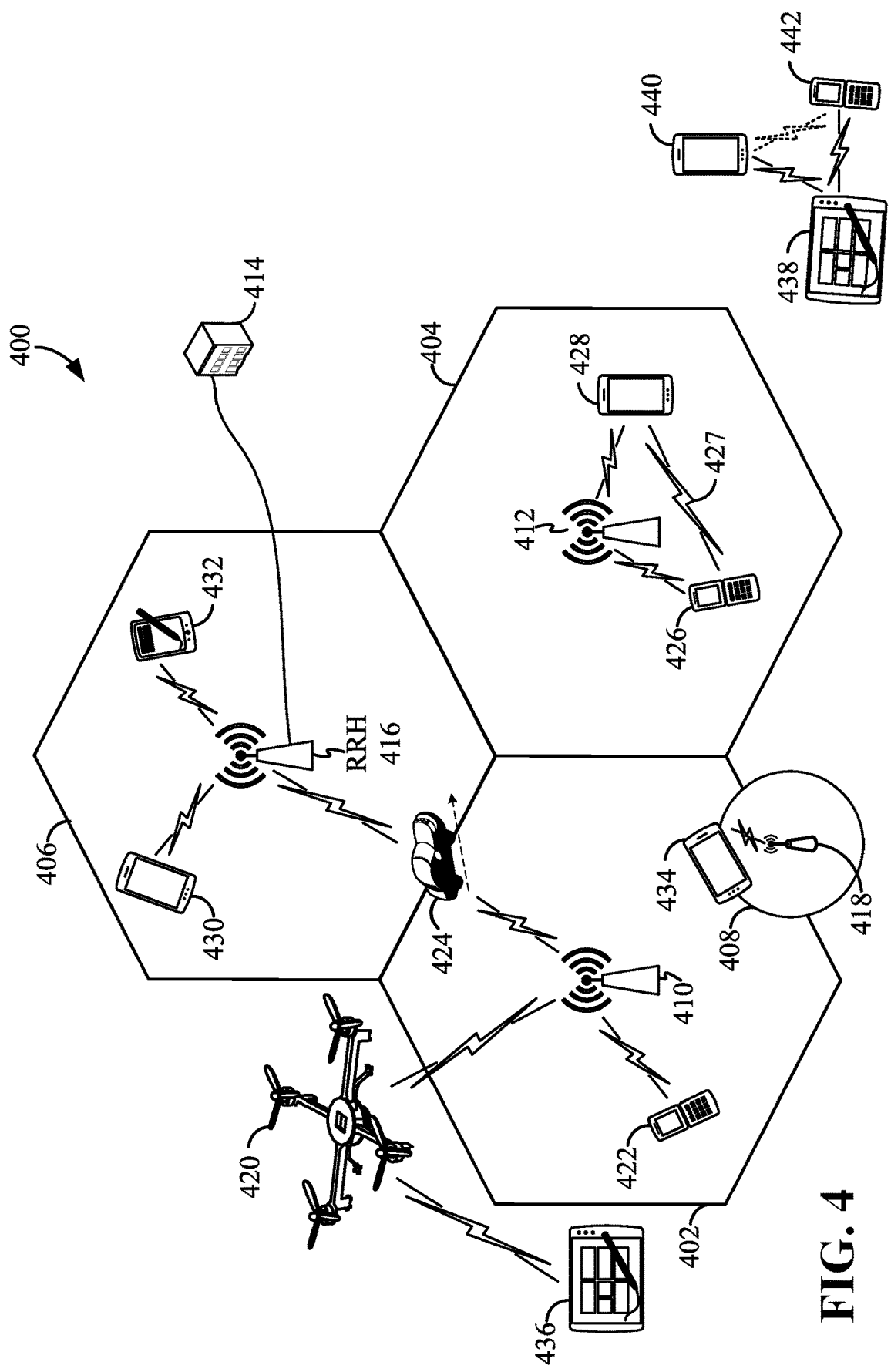
FIG. 4 is a conceptual illustration of an example of a radio access network according to some aspects.
Figure 5:
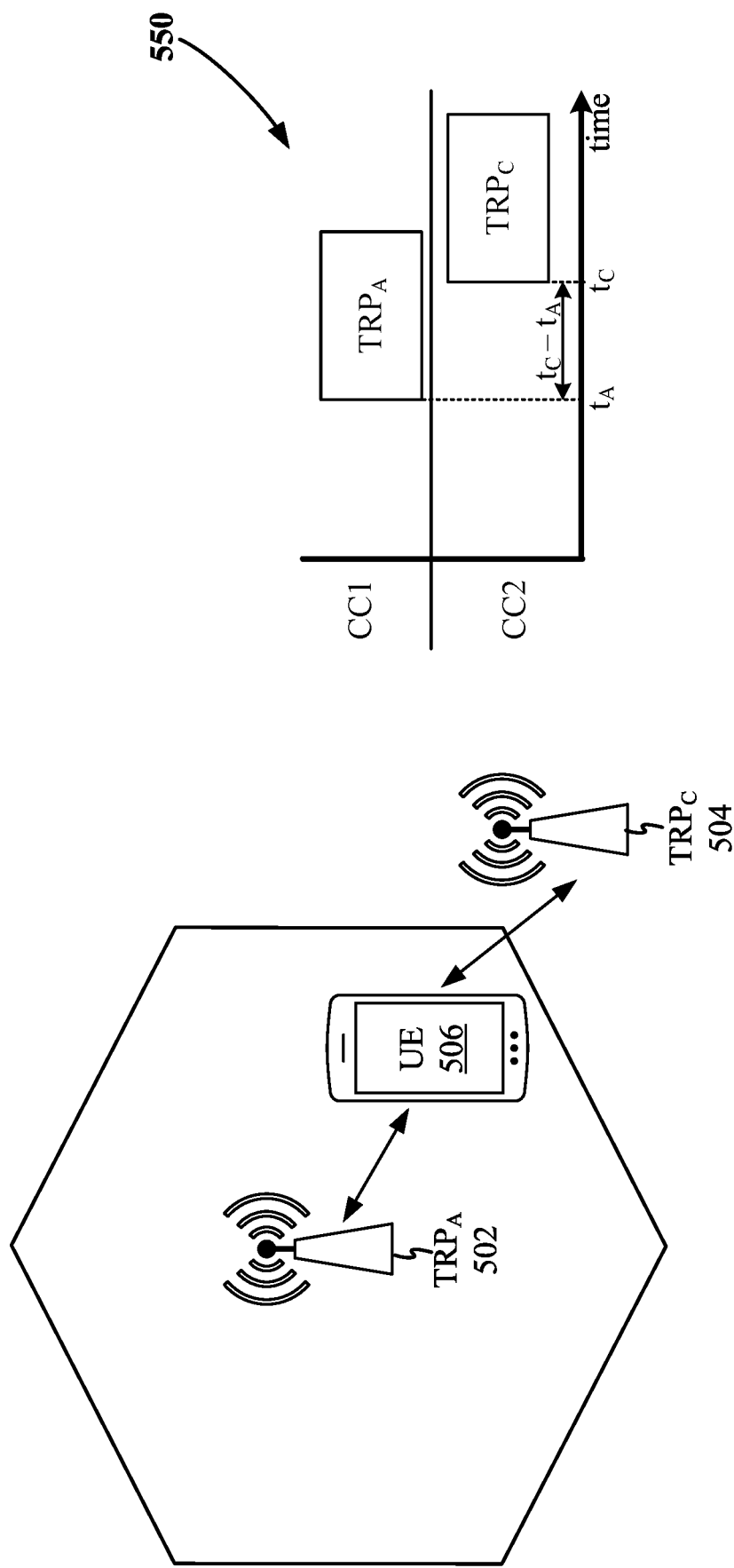
FIG. 5 is a conceptual illustration of multi-carrier communication according to some aspects.
Figure 7:
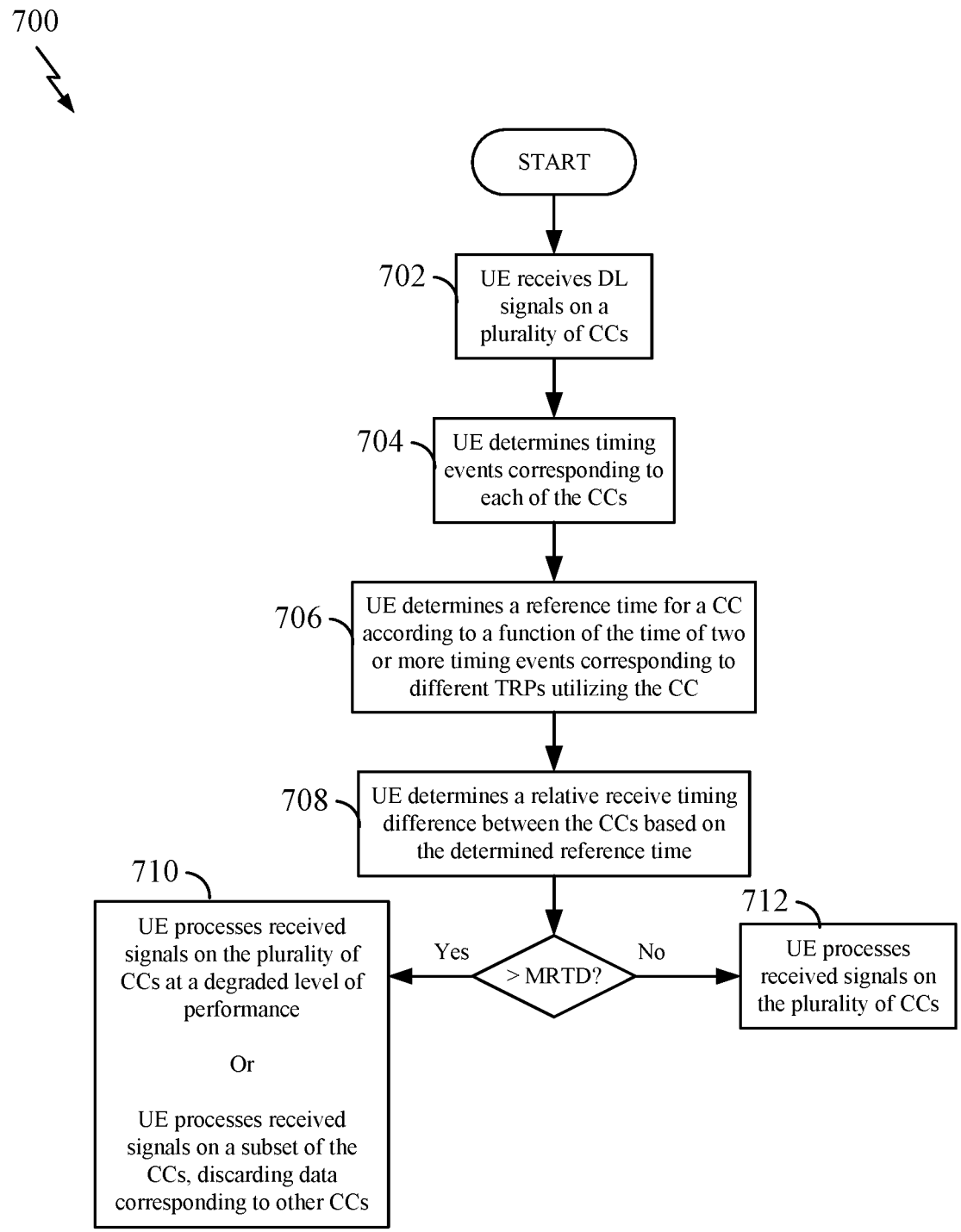
FIG. 7 is a flow chart illustrating an exemplary process for determining a reference time for a downlink carrier according to some aspects of the disclosure.

Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described in any one of the FIGS. 1, 4, 5, and/or 6, and utilizing, for example, the processes and/or algorithms described herein in relation to FIGS. 7 and/or 8.

Referring now to FIG. 4, by way of example and without limitation, a schematic illustration of a RAN 400 is provided. In some examples, the RAN 400 may be the same as the RAN 104 described above and illustrated in FIG. 1. The geographic area covered by the RAN 400 may be divided into cellular regions (cells) that can be uniquely identified by a user equipment (UE) based on an identification (e.g., a cell ID) broadcasted from one access point or base station. FIG. 4 illustrates macrocells 402, 404, and 406, and a small cell 408, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 4, two base stations 410 and 412 are shown in cells 402 and 404; and a third base station 414 is shown controlling a remote radio head (RRH) 416 in cell 406. That is, a base station can have an integrated antenna or can be connected to an antenna or RRH by feeder cables. In the illustrated example, the cells 402, 404, and 126 may be referred to as macrocells, as the base stations 410, 412, and 414 support cells having a large size. Further, a base station 418 is shown in the small cell 408 (e.g., a microcell, picocell, femtocell, home base station, home Node B, home eNode B, etc.) which may overlap with one or more macrocells. In this example, the cell 408 may be referred to as a small cell, as the base station 418 supports a cell having a relatively small size. Cell sizing can be done according to system design as well as component constraints.

In some examples, the RAN 400 may be a multi-RAT access network (MR-AN).

With an MR-AN, a single RAN may provide one or more cells for each of a plurality of RATs, and may support inter- and intra-RAT mobility and aggregation. The RAN 400 may provide for carrier aggregation (CA) of sub-6 GHz carriers, above-6 GHz carriers, mmWave carriers, etc.

In still further examples, the RAN 400 may be configured for multi-radio dual connectivity (MR-DC), which may provide dual connectivity between E-UTRA and NR nodes, or between two NR nodes (e.g., NR-DC, EN-DC, NE-DC, and/or NGEN-DC).

It is to be understood that the radio access network 400 may include any number of wireless base stations and cells. Further, a relay node may be deployed to extend the size or coverage area of a given cell. The base stations 410, 412, 414, 418 provide wireless access points to a core network for any number of mobile apparatuses. In some examples, the base stations 410, 412, 414, and/or 418 may be the same as the base station/scheduling entity 108 described above and illustrated in FIG. 1.

FIG. 4 further includes a quadcopter or drone 420, which may be configured to function as a base station. That is, in some examples, a cell may not necessarily be stationary, and the geographic area of the cell may move according to the location of a mobile base station such as the quadcopter 420.

Within the RAN 400, the cells may include UEs that may be in communication with one or more sectors of each cell. Further, each base station 410, 412, 414, 418, and 420 may be configured to provide an access point to a core network 102 (see FIG. 1) for all the UEs in the respective cells. For example, UEs 422 and 424 may be in communication with base station 410; UEs 426 and 428 may be in communication with base station 412; UEs 430 and 432 may be in communication with base station 414 by way of RRH 416; UE 434 may be in communication with base station 418; and UE 436 may be in communication with mobile base station 420. In some examples, the UEs 422, 424, 426, 428, 430, 432, 434, 436, 438, 440, and/or 442 may be the same as the UE/scheduled entity 106 described above and illustrated in FIG. 1.

Some examples of a RAN 400 may include one or more cells (corresponding to a given cell ID) that utilize coordinated multi-point (CoMP) communication via multiple transmission and reception points (mTRP). This scheme generally involves dynamic coordination among multiple geographically separated TRPs to provide spatial diversity to one or both of UL and/or DL communication, and to improve communication performance at a cell edge. In a CoMP example, a cell may include two or more TRPs that are generally not collocated, and are physically at different positions. However, those two or more TRPs in a given cell share the same cell ID. Thus, a RAN 400 may support transmission to, and/or reception from, a single UE from multiple TRPs in a given cell.

In some examples, a mobile network node (e.g., quadcopter 420) may be configured to function as a UE. For example, the quadcopter 420 may operate within cell 402 by communicating with base station 410.

In a further aspect of the RAN 400, sidelink signals may be used between UEs without necessarily relying on scheduling or control information from a base station. For example, two or more UEs (e.g., UEs 426 and 428) may communicate with each other using peer to peer (P2P) or sidelink signals 427 without relaying that communication through a base station (e.g., base station 412). In a further example, UE 438 is illustrated communicating with UEs 440 and 442. Here, the UE 438 may function as a scheduling entity or a primary sidelink device, and UEs 440 and 442 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 440 and 442 may optionally communicate directly with one another in addition to communicating with the scheduling entity 438. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 400, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

The air interface in the radio access network 400 may utilize one or more multiplexing and multiple access algorithms to enable simultaneous communication of the various devices. For example, 5G NR specifications provide multiple access for UL transmissions from UEs 422 and 424 to base station 410, and for multiplexing for DL transmissions from base station 410 to one or more UEs 422 and 424, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). 4G LTE specifications provide for multiple access for UL transmissions from UEs 422 and 424 to base station 410 utilizing SC-FDMA, and for multiplexing DL transmissions from base station 410 to one or more UEs 422 and 424 utilizing OFDM with a CP. However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

When utilizing OFDM, an air interface may be defined according to a two-dimensional grid of resource elements, defined by separation of resources in frequency by defining a set of closely spaced frequency tones or sub-carriers, and separation in time by defining a sequence of symbols having a given duration. By setting the spacing between the tones based on the symbol rate, inter-symbol interference can be eliminated. OFDM carriers provide for high data rates by allocating a data stream in a parallel manner across multiple subcarriers.

OFDM air interfaces may utilize a cyclic prefix (CP). That is, a multipath environment degrades the orthogonality between subcarriers because symbols received from reflected or delayed paths may overlap into the following symbol. A CP addresses this problem by copying the tail of each symbol and pasting it onto the front of the OFDM symbol. In this way, any multipath components from a previous symbol fall within the effective guard time at the start of each symbol, and can be discarded.

On a given carrier, there may be one set of frames, subframes, and/or slots in the UL, and another set of frames, subframes, and/or slots in the DL. In some examples, a subframe may be defined in a way that a subframe consists of one or multiple adjacent slots. In other examples, a subframe may be defined according to a length of time (e.g., 1 ms), a number of OFDM symbols, or in any other suitable manner.

In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

Carrier resources may be scheduled to carry one or more physical channels, including control channels, shared channels, data channels, etc. Other resources on the carrier may also carry pilots or reference signals. These pilots or reference signals may, for example, provide for a receiving device to perform channel estimation of the corresponding channel, which may enable coherent demodulation/detection of the control and/or data channels on the carrier.

In a DL transmission, the transmitting device (e.g., base station 410) may allocate resources to carry DL control information including one or more DL control channels that generally carry information originating from higher layers, such as a physical broadcast channel (PBCH), a physical downlink control channel (PDCCH), etc., to one or more UEs or scheduled entities. In addition, DL resources may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

In an UL transmission, a transmitting device (e.g., UEs 422 and 424) may utilize scheduled resources to carry UL control information (UCI). The UCI can originate from higher layers via one or more UL control channels, such as a physical uplink control channel (PUCCH), a physical random access channel (PRACH), etc., to the scheduling entity. Further, UL resources may carry UL physical signals that generally do not carry information originating from higher layers, such as demodulation reference signals (DM-RS), phase-tracking reference signals (PT-RS), sounding reference signals (SRS), etc. In some examples, the control information may include a scheduling request (SR), i.e., a request for the scheduling entity to schedule uplink transmissions. Here, in response to the SR, the scheduling entity may transmit downlink control information that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information.

In addition to control information, resources may be allocated for user data or traffic data. Such traffic may be carried on one or more traffic channels, such as, for a DL transmission, a physical downlink shared channel (PDSCH); or for an UL transmission, a physical uplink shared channel (PUSCH).

The channels or carriers described above are not necessarily all the channels or carriers that may be utilized between a scheduling entity and scheduled entities or UEs, and those of ordinary skill in the art will recognize that other channels or carriers may be utilized in addition to those illustrated, such as other traffic, control, and feedback channels.

As briefly discussed above, a RAN may employ carrier aggregation (CA), such that a UE may be enabled to simultaneously communicate with the RAN utilizing two or more carriers, called component carriers (CC). Generally, the main CC is called a primary component carrier (PCC), and other CCs are called secondary component carriers (SCC). By aggregating multiple CCs in this fashion, the bandwidth, and accordingly, the data rate for an end user can be increased.

In a RAN configured for CA, a UE may aggregate intra-band CCs (i.e., CCs belonging to the same frequency band), which may or may not be contiguous with one another. In some examples, a UE may also aggregate inter-band CCs, which are non-contiguous carriers that belong to different frequency bands.

In still further examples, the RAN 400 may be configured for dual connectivity (DC). While DC is similar to CA, it differs in several aspects. For example, while in CA all CCs belong to the same TRP, DC provides for a UE to communicate over aggregated CCs that belong to different cells. These cells are referred to as a master cell group (MCG) and a secondary cell group (SCG). Further, while CA may utilize a single PUCCH for UL signaling corresponding to all aggregated CCs, DC provides for separate PUCCHs at the MCG and SCG. Some examples may use a combination of both CA and DC in a given RAN 400. Those of ordinary skill in the art will be familiar with these multi-carrier communication schemes, and will understand that CA and DC have other differences as well.

In 3GPP specifications for 5G NR, a RAN 400 may be configured for multi-radio dual connectivity (MR-DC), which may provide dual connectivity where CCs utilize different RATs. Some examples of MR-DC provide for DC between E-UTRA and NR CCs, or between two NR CCs. For example, MR-DC may include NR-DC (DC between two NR CCs), EN-DC (DC using an NR gNB as the MCG and E-UTRA eNB as the SCG), NE-DC (DC using an E-U IRA eNB as the MCG and an NR gNB as the SCG), and/or NGEN-DC (NG-RAN E-UTRA-NR DC).

In relation to such communication schemes that utilize multiple CCs, 3GPP NR specifications include certain defined parameters called a maximum receive timing difference (MRTD) and maximum transmit timing difference (MTTD). These parameters correspond to timing differences between different CCs.

For example, FIG. 5 illustrates an example where a UE 506 is configured for DC aggregating a first CC between the UE 506 and a first TRP (TRP$_A$) 502, and a second CC between the UE 506 and a second TRP (TRP$_C$) 504. At any given moment, the UE 506 may be located at a position where its distance from TRP$_A$ 502 is different from its distance from TRP$_B$ 504. Accordingly, even if DL transmissions from the different TRPs were sent at exactly the same time, the UE 506 would receive those transmissions at different times according to the propagation speed of light. In FIG. 5, a chart 550 illustrates the timing at the UE 506 receiver when transmissions are received on two CCs labeled CC1 and CC2, where it is assumed that the signal from TRP$_A$ 502 was transmitted at the same time as the signal from TRP$_C$ 504. Here, this relative receive timing difference between the two CCs is labeled $t_{AC}$, which is calculated simply as the difference between the time when the UE 506 received the signal from TRP$_A$, $t_A$, and the time when the UE 506 received the signal from TRP$_B$, $t_B$. Similarly, if the UE 506 sent UL transmissions on both CCs at the same time, the TRPs would receive those transmissions at different times. Moreover, these timing differences in both directions may be compounded if the TRPs have an offset between their respective clocks.

In a RAN 400 configured for EN-DC operation, NR specifications provide that a UE shall be capable of handling a specified relative receive timing difference between a subframe timing boundary of an E-UTRA cell belonging to the MCG and the closest slot timing boundary of an NR cell belonging to the SCG. This specified relative receive timing difference is referred to as the maximum receive timing difference (MRTD). Although the values of MRTDs differ, these specifications provide similar definitions of MRTDs for several more RAN configurations other than EN-DC, including NE-DC, NR-DC, and also for NR carrier aggregation (CA). And furthermore, even within each of these configurations, different MRTD values are provided for inter-band DC, intra-band DC, intra-band non-contiguous CA, intra-band contiguous CA, and inter-band CA.

For EN-DC operation, these NR specifications similarly provide that a UE shall be capable of handling a relative transmission timing difference between a subframe timing boundary of an E-UTRA PCell and the closest slot timing boundary of an NR cell belonging to the SCG. This specified relative transmission timing difference is referred to as the maximum transmit timing difference (MTTD). Again, although the values of MTTDs differ, these specifications provide similar definitions of MTTDs for several more RAN configurations other than EN-DC, including NE-DC, NR-DC, and also for NR carrier aggregation (CA). And furthermore, even within each of these configurations, different MTTD values are provided for inter-band DC, intra-band DC, intra-band non-contiguous CA, intra-band contiguous CA, and inter-band CA. With respect to CA configurations, in some examples the MTTD may be determined based on a difference between timing advances or timing advance groups (TAGs) on the different carriers.

When considering these parameters MRTD and MTTD in relation to a single TRP on each carrier, the definition of MRTD/MTTD is quite clear, as described above. However, if a carrier has multiple TRPs (e.g., in a CoMP scenario using mTRP), then a UE may receive a DL signal from each of multiple TRPs at different time instances in a single carrier. Similarly, in this scenario a UE may transmit a UL signal to each of multiple TRPs over a single carrier, where those TRPs receive the UL signal at different time instances. Hence, the relative timing differences between the carriers become ambiguous.

Figure 6:
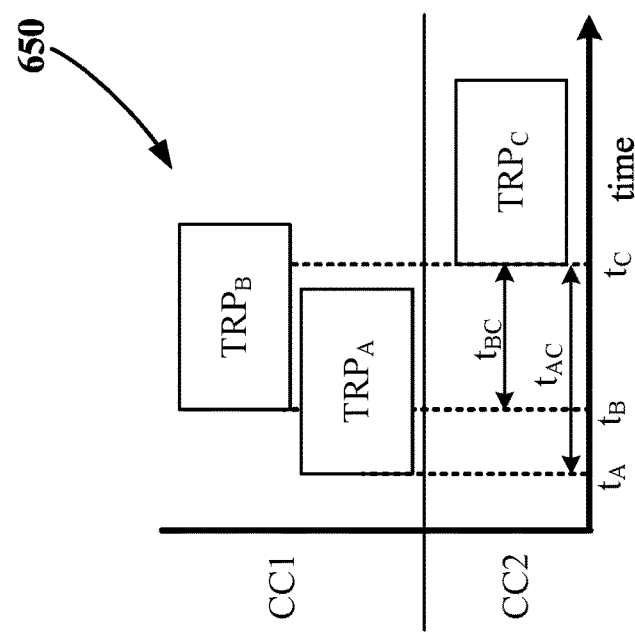
FIG. 6 is a conceptual illustration of multi-carrier communication with coordinated multi-point (CoMP) according to some aspects.
Figure 6:
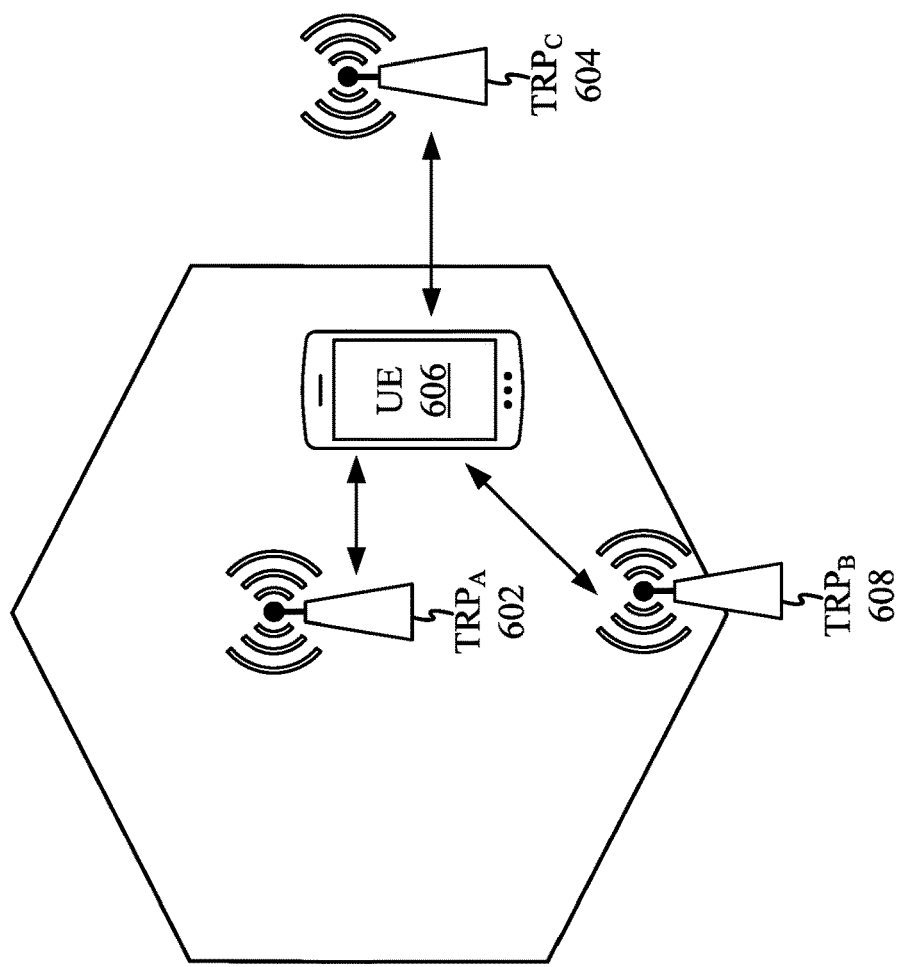

For example, FIG. 6 illustrates an example where a UE 606 is configured for DC aggregating a first CC between the UE 606 and a first TRP (TRP$_A$) 602, and a second CC between the UE 606 and a second TRP (TRP$_C$) 604. However, in this example and unlike the example in FIG. 5, the cell corresponding to the first CC is configured for CoMP, utilizing multiple TRPs, including the first TRP, TRP$_A$, and a third TRP (TRP$_B$). As discussed above, these TRPs may both transmit signals to the UE 606 over the same CC.

As with the example in FIG. 5, the UE 606 may be located at a position where its distance from TRP$_A$ 602 is different from its distance from TRP$_B$ 604. Furthermore, in this example, the distance between the UE 606 and TRP$_A$ 606 may also differ from the distance between the UE 606 and TRP$_B$ 608. Accordingly, even if DL transmissions from all three TRPs were sent at exactly the same time, the UE 606 would receive those transmissions at different times according to the propagation speed of light. In FIG. 6, a chart 650 illustrates the timing at the UE 606 receiver when transmissions are received on two CCs labeled CC1 and CC2, where it is assumed that the signals from each of TRP$_A$ 602, TRP$_B$ 608, and TRP$_C$ 604 were transmitted at the same time.

Unlike the scenario in FIG. 5, here, the relative receive timing difference between the two CCs is ambiguous. As seen in FIG. 6, there may be two different relative receive timing differences to consider: a timing difference between a signal received from TRP$_A$ 602 and a signal received from TRP$_C$ 604 ($t_{AC}$); and a timing difference between a signal received from TRP$_B$ 608 and a signal received from TRP$_C$ 604 ($t_{BC}$). In this illustrated example, it may be unclear whether an MRTD should be determined based on $t_{AC}$, $t_{BC}$, or some other value. And, with essentially the same issues arising in relation to UL carriers, when multiple TRPs are used on a carrier in a DC configuration, the definition of an MTTD may also be unclear. Accordingly, some aspects of the present disclosure provide for an unambiguous reference time in each carrier to be utilized for calculation of an MRTD or MTTD. For example, in the scenario shown in FIG. 6, the reference timing for CC1 may be a function of $t_A$ and $t_B$. This reference timing may be equal to $t_A$, equal to $t_B$, or calculated according to some suitable function (e.g., a weighted combination) of $t_A$ and $t_B$.

In the various examples described in this disclosure, including those described in relation to FIGS. 5 and 6, the described relative timing differences may correspond to a time difference between any suitable predefined events on the respective carriers. Within this disclosure, such events may be referred to as timing events. In some examples, a timing event may be a UE's reception of a suitable reference signal or synchronization signal on the corresponding carrier. The timing event may generally correspond to any suitable predefined event, including but not limited to a reference signal reception at a UE, a reference signal transmission from a UE; a slot boundary; a subframe boundary; a timing of a UE receiving or transmitting a data signal or a control signal; etc.

In an aspect of this disclosure, a reference time may be defined for a carrier as a function of the time of two or more timing events corresponding to different TRPs utilizing the same carrier. For example, if there are two such timing events, labeled $t_A$ and $t_C$, a reference time may be defined as the earlier one; the average of the two; the arithmetic mean; the geometric mean; a weighted average of the two; or any other suitable function of the timing events $t_A$ and $t_C$.

In a further aspect, a UE may utilize the determined reference time to determine a relative timing difference between carriers in a dual connectivity configuration, a carrier aggregation configuration, or both.

FIG. 7 is a flow chart illustrating an exemplary process 700 for determining a relative receive timing difference between CCs in accordance with some aspects of the present disclosure. As described below, some or all illustrated features may be omitted in a particular implementation within the scope of the present disclosure, and some illustrated features may not be required for implementation of all embodiments. In some examples, the process 700 may be carried out by the UE 300 illustrated in FIG. 3. In some examples, the process 700 may be carried out by any suitable apparatus or means for carrying out the functions or algorithm described below.

In one example, the process 700 may be performed by a processor such as the processor 304 of the scheduled entity 300 (e.g., a UE), a communication controller and/or dedicated circuitry for determining reference timings and time differences between signals based on reference timings (e.g., communication controller circuit 340 and the timing circuit 642) executing computer-readable instructions (e.g., the timing instructions 350 and the reference time determination instructions 352).

At block 702, a UE may receive DL signals on each of a plurality of CCs. Here, the UE may be configured for dual connectivity (DC), carrier aggregation (CA), or both. And further, on one or more of the plurality of CCs, the UE may receive two or more signals that arrive from two or more respective TRPs in a CoMP configuration.

At block 704, a UE may determine a time of timing events corresponding to each of the plurality of CCs. These timing events may be any suitable predefined events on the respective CCs, including but not limited to a reference signal reception at a UE, a slot boundary; a subframe boundary; a timing of a UE receiving a data signal or a control signal; etc. And further, for the one or more CCs that correspond to a CoMP configuration with two or more TRPs, the UE may determine times of two or more respective timing events corresponding to each of the two or more TRPs using that CC.

At block 706, a UE may determine a reference time for a CC according to a function of the time of two or more timing events corresponding to different TRPs using a CC. That is, a UE may calculate a reference time as a function of the determined times of the two or more timing events corresponding to the two or more TRPs using that CC. In various examples, the function of the determined times may be any suitable function, such as the earlier of the timing events, the later of the timing events, the average time of the timing events, a weighted average of the time of the timing events, the arithmetic mean of the time of the timing events, the geometric mean of the time of the timing events, etc. Here, the UE may determine reference times for any suitable number of CCs, such as in a case where two or more CCs each have two or more TRPs utilizing those respective CCs. And in a case where a given CC has only one TRP, the reference time may be set as equal to the time of the timing event corresponding to that TRP.

At block 708, a UE may determine a relative receive timing difference between the CCs based on the determined reference time or reference times and generate a relative reception time difference (RTD) value. For example, for a UE receiving signals on two CCs, the UE may calculate a relative receive timing difference by simply subtracting one CC's reference time from the other CC's reference time and use that time difference or a representation of that time difference as the RTD value. The RTD value may be stored in a register or other memory construct by the UE for later use.

If the determined relative receive timing difference (i.e., the RTD value) is greater than a MRTD (e.g., a predefined value stored in UE memory that may be received from the base station, the value corresponding to a RAN configuration) the UE (or a processor of the UE) may output an indication that the RTD value is greater than the MRTD and then the process may proceed to block 710. Any suitable indication may be employed. Non-limiting examples include numerical condition codes, a Boolean value, or any other suitable indication. Such indications may be temporarily stored in working memory of a processor and may be accessed as a variable by program code executed by the processor or as contents of a fixed physical memory location such as a register or other dedicated memory address.

At block 710, in some examples, the UE may process the received signals on each of the plurality of CCs at a degraded level of performance. Processing the received signals may include, as non-limiting examples, decoding (or attempting) to decode a PSDSCH transmission or other transmission, applying error correcting codes to the received signals, and generating HARQ-ACK or other feedback signals indicating whether the received signals were successfully decoded. For example, when the UE processes signals at a degraded level of performance, the UE may ignore all or portions of some of the received signals received at a time later than the reference time plus the MRTD. As one example, the UE may suffer from an increased block error rate (BLER) relative to a BLER if the relative receive timing difference is n greater than the MRTD. Further, based on the UE processing of the received signals on each of the plurality of CCs, the UE may transmit a corresponding acknowledgment or negative acknowledgment (e.g., HARQ-ACK) based on an integrity check of data received on the respective CCs.

At block 710 in some other examples, the UE may process received signals on a subset of the plurality of CCs, e.g., only one of two CCs in a configuration with two CCs. That is, if the determined relative receive timing difference is greater than the MRTD threshold value, then the UE may discard data corresponding to one or more CCs. Further, based on UE processing of the received signals on the subset of CCs, the UE may transmit a corresponding HARQ-ACK based on an integrity check of data received on the subset of CCs; and the UE may forgo to transmit a HARQ-ACK corresponding to the discarded signal(s).

On the other hand, if the determined relative receive timing difference is not greater than the MRTD, then the process may proceed to block 712. At block 712, the UE may process the received signals on each of the plurality of CCs. In some examples, the UE may process the signals received on the different CCs utilizing a single fast Fourier transform (FFT).

Figure 8:
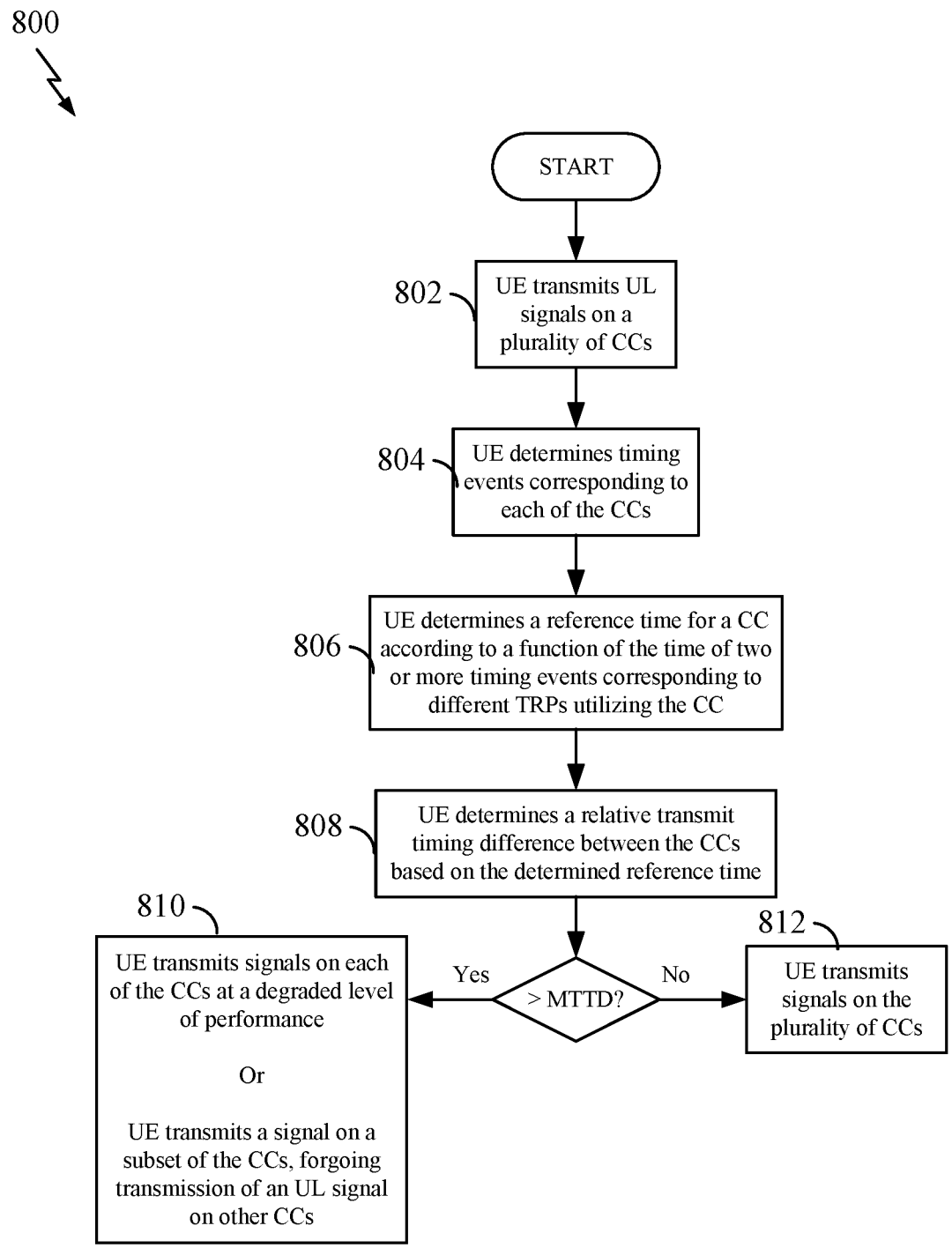
FIG. 8 is a flow chart illustrating an exemplary process for determining a reference time for an uplink carrier according to some aspects of the disclosure.

FIG. 8 is a flow chart illustrating an exemplary process 800 for determining a relative transmit timing difference between CCs in accordance with some aspects of the present disclosure. As described below, some or all illustrated features may be omitted in a particular implementation within the scope of the present disclosure, and some illustrated features may not be required for implementation of all embodiments. In some examples, the process 800 may be carried out by the UE 300 illustrated in FIG. 3. In some examples, the process 800 may be carried out by any suitable apparatus or means for carrying out the functions or algorithm described below.

In one example, the process 800 may be performed by a processor such as the processor 304 of the scheduled entity 300 (e.g., a UE), a communication controller and/or dedicated circuitry for determining reference timings and time differences between signals based on reference timings (e.g., the communication controller 340 and the reference timing circuit 342) executing computer-readable instructions (e.g., communication instructions 350 and the reference time determination instructions 352).

At block 802, a UE may transmit UL signals on each of a plurality of CCs. Here, the UE may be configured for dual connectivity (DC), carrier aggregation (CA), or both. And further, on one or more of the plurality of CCs, the UE may transmit two or more signals that arrive at two or more respective TRPs in a CoMP configuration.

At block 804, a UE may determine a time of timing events corresponding to each of the plurality of CCs. These timing events may be any suitable predefined events on the respective CCs, including but not limited to a reference signal transmission from a UE, a slot boundary; a subframe boundary; a timing of a UE transmitting a data signal or a control signal; etc. And further, for the one or more CCs that correspond to a CoMP configuration with two or more TRPs, the UE may determine times of two or more respective timing events corresponding to each of the two or more TRPs using that CC.

In some examples, where a UE receives a timing advance (TA) from a network, the UE may utilize TA values as corresponding timing events. That is, as discussed further below, a relative difference between TAs for different TRPs on a given CC may be utilized to determine a reference time for that CC.

At block 806, a UE may determine a reference time for a CC according to a function of the time of two or more timing events corresponding to different TRPs using a CC. That is, a UE may calculate a reference time as a function of the determined times of the two or more timing events corresponding to the two or more TRPs using that CC. In various examples, the function of the determined times may be any suitable function, such as the earlier of the timing events, the later of the timing events, the average time of the timing events, a weighted average of the time of the timing events, the arithmetic mean of the time of the timing events, the geometric mean of the time of the timing events, etc. Here, the UE may determine reference times for any suitable number of CCs, such as in a case where two or more CCs each have two or more TRPs utilizing those respective CCs. And in a case where a given CC has only one TRP, the reference time may be set as equal to the time of the timing event corresponding to that TRP.

In an example where the UE utilizes TA values for timing events, the UE may determine a reference time for a given CC according to a function of the two or more TA values corresponding to different TRPs utilizing that CC.

At block 808, a UE may determine a relative transmit timing difference between the CCs based on the determined reference time or reference times and generate a corresponding transmit time difference (TTD) value. For example, for a UE transmitting signals on two CCs, the UE may calculate a relative transmit timing difference by simply subtracting one CC's reference time from the other CC's reference time and use that time difference or a representation of that time difference as the TTD value. The TTD value may be stored in a register or other memory construct by the UE for later use.

If the determined relative receive timing difference is greater than a MTTD (e.g., a predefined value stored in UE memory that may be received from the base station, the value corresponding to a RAN configuration), then the UE (or a processor of the UE, for example) may output an indication that the TTD is greater than the MTTD and the process may proceed to block 810. Any suitable indication may be employed. Non-limiting examples include numerical condition codes, a Boolean value, or any other suitable indication. Such indications may be temporarily stored in working memory of a processor and may be accessed as a variable by program code executed by the processor or as contents of a fixed physical memory location such as a register or other dedicated memory address.

At block 810, in some examples, the UE may transmit signals on each of the plurality of CCs at a degraded level of performance. For example, the UL transmission may suffer from an increased block error rate (BLER) relative to a BLER if the relative transmit timing difference is greater than the MTTD. In some examples, the UE may not transmit all or portions of some signals after a time greater than the MTTD has elapsed with respect to the reference time. Alternatively, one or more TRPs may not be able to successfully process signals transmitted by the UE as a result of the TTD value exceeding the MTTD. At block 810, in some other examples, the UE may transmit a signal on a subset of the plurality of CCs, e.g., only one of two CCs in a configuration with two CCs. That is, if the determined relative transmit timing difference is greater than the MTTD threshold value, then the UE may forgo transmission of an UL signal corresponding to one or more CCs.

On the other hand, if the determined relative transmit timing difference is not greater than the MTTD, then the process may proceed to block 812. At block 812, the UE may transmit signals on each of the plurality of CCs.

Further Examples Having a Variety of Features

Example 1: A wireless communication apparatus, method, device, system, equipment, and/or article of manufacture for receiving a downlink signal on each of a plurality of component carriers (CCs); determining respective timing events corresponding to each of the plurality of CCs; determining a reference time for a first CC of the plurality of CCs; and generating a receive time difference (RTD) value indicating a relative receive timing difference between the plurality of CCs based on the determined reference time. The reference time corresponds to a function of two or more of the timing events corresponding to different transmission and reception points (TRPs) utilizing the first CC.

Example 2: The wireless communication apparatus, method, device, system, equipment, and/or article of manufacture of Example 1, further including determining that the RTD value is greater than a threshold maximum receive timing difference (MRTD) and processing received signals on the plurality of CCs at a degraded level of performance, in response to said determining that the RTD value is greater than the MRTD.

Example 3: The wireless communication apparatus, method, device, system, equipment, and/or article of manufacture of Example 1, further including determining that RTD value is greater than a threshold maximum receive timing difference (MRTD); and processing received signals on a subset of the plurality of CCs while discarding data corresponding to one or more CCs other than the subset of CCs, in response to said determining that RTD value is greater than a threshold maximum receive timing difference (MRTD).

Example 4: The wireless communication apparatus, method, device, system, equipment, and/or article of manufacture of Example 3, wherein the MRTD is one of: a first MRTD for intra-band EN-DC; a second MRTD for inter-band EN-DC; a third MRTD for intra-band NE-DC; a fourth MRTD for inter-band NE-DC; a fifth MRTD for intra-band NR-DC; a sixth MRTD for inter-band NR-DC; a seventh MRTD for intra-band NGEN-DC; an eighth MRTD for inter-band NGEN-DC; a ninth MRTD for intra-band CA; or a tenth MRTD for inter-band CA.

Example 5: The wireless communication apparatus, method, device, system, equipment, and/or article of manufacture of Example 1, wherein determining the respective timing events corresponding to each of the plurality of CCs comprises determining a timing event for each of one or more TRPs utilizing the respective CC, based on one of a synchronization signal, a demodulation reference signal, a channel state information reference signal, a tracking reference signal, or other reference signal received from the respective TRP.

Example 6: A wireless communication apparatus, method, device, system, equipment, and/or article of manufacture for transmitting an uplink signal on each of a plurality of component carriers (CCs); determining respective timing events corresponding to each of the plurality of CCs; determining a reference time for a first CC of the plurality of CCs; and generating a transmit timing difference (TTD) value between the plurality of CCs based on the determined reference time. The reference time corresponds to a function of two or more of the timing events corresponding to different transmission and reception points (TRPs) utilizing the first CC.

Example 7: The wireless communication apparatus, method, device, system, equipment, and/or article of manufacture of Example 6, further including determining that the TTD value is greater than a threshold maximum transmit timing difference (MTTD); and transmitting signals on the plurality of CCs, at a degraded level of performance, in response to said determining that the TTD value is greater than the MTTD.

Example 8: The wireless communication apparatus, method, device, system, equipment, and/or article of manufacture of Example 6, further including determining that the TTD value is greater than a threshold maximum transmit timing difference (MTTD); and transmitting signals on a subset of the plurality of CCs while forgoing to transmit signals on one or more CCs other than the subset of CCs, in response to said determining that the TTD value is greater than the MTTD.

Example 9: The wireless communication apparatus, method, device, system, equipment, and/or article of manufacture of Example 8, wherein the MTTD is one of: a first MTTD for intra-band EN-DC; a second MTTD for inter-band EN-DC; a third MTTD for intra-band NE-DC; a fourth MTTD for inter-band NE-DC; a fifth MTTD for intra-band NR-DC; a sixth MTTD for inter-band NR-DC; a seventh MTTD for intra-band NGEN-DC; an eighth MTTD for inter-band NGEN-DC; a ninth MTTD for intra-band CA; or a tenth MTTD for inter-band CA.

Example 10: The wireless communication apparatus, method, device, system, equipment, and/or article of manufacture of Example 6, wherein determining the respective timing events corresponding to each of the plurality of CCs comprises determining a timing event for each of one or more TRPs utilizing the respective CC, based on one of a synchronization signal, a demodulation reference signal, a channel state information reference signal, a tracking reference signal, or other reference signal received from the respective TRP.

Several aspects of a wireless communication network have been presented with reference to an exemplary implementation. As those skilled in the art will readily appreciate, various aspects described throughout this disclosure may be extended to other telecommunication systems, network architectures, and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features, and/or functions illustrated in FIGS. 1-8 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-8 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at a user equipment (UE), the method comprising:
   Transmitting at least one respective uplink signal on each of a plurality of component carriers (CCs);
   determining respective timing events corresponding to each of the plurality of CCs, wherein the respective timing events are associated with the at least one respective uplink signal;
   determining a reference time for a first CC of the plurality of CCs, the reference time corresponding to a function of two or more of the timing events corresponding to different transmission and reception points (TRPs) utilizing the first CC; and
   generating a transmit timing difference (TTD) value between the plurality of CCs based on the determined reference time.

2. The method of claim 1, further comprising:
   determining that the TTD value is greater than a threshold maximum transmit timing difference (MTTD); and
   transmitting signals on the plurality of CCs at a degraded level of performance, in response to said determining that the TTD value is greater than the MTTD.

3. The method of claim 1, further comprising:
   determining that the TTD value is greater than a threshold maximum transmit timing difference (MTTD); and
   transmitting signals on a subset of the plurality of CCs while forgoing to transmit signals on one or more CCs other than the subset of CCs, in response to said determining that the TTD value is greater than the MTTD.

4. The method of claim 3, wherein the MTTD is one of:
a first MTTD for intra-band EN-DC;
a second MTTD for inter-band EN-DC;
a third MTTD for intra-band NE-DC;
a fourth MTTD for inter-band NE-DC;
a fifth MTTD for intra-band NR-DC;
a sixth MTTD for inter-band NR-DC;
a seventh MTTD for intra-band NGEN-DC;
an eighth MTTD for inter-band NGEN-DC;
a ninth MTTD for intra-band CA; or
a tenth MTTD for inter-band CA.

5. The method of claim 1,
wherein determining the respective timing events corresponding to each of the plurality of CCs comprises determining a timing event for each of one or more TRPs utilizing the respective CC, based on one of a synchronization signal, a demodulation reference signal, a channel state information reference signal, a tracking reference signal, or other reference signal received from the respective TRP.

6. A wireless communication device, comprising:
a processor;
a transceiver coupled to the processor; and
a memory coupled to the processor,
wherein the processor is configured to cause the wireless communication device to:
  transmit at least one respective uplink signal on each of a plurality of component carriers (CCs) using the transceiver;
  determine respective timing events corresponding to each of the plurality of CCs, wherein the respective timing events are associated with the at least one respective uplink signal;
  determine a reference time for a first CC of the plurality of CCs, the reference time corresponding to a function of two or more of the timing events corresponding to different transmission and reception points (TRPs) utilizing the first CC; and
  generating a transmit timing difference (TTD) value between the plurality of CCs based on the determined reference time.

7. The device of claim 6, wherein the processor and the memory are further configured to cause the device to:
determine that the TTD value is greater than a threshold maximum transmit timing difference (MTTD); and
transmit signals on the plurality of CCs, using the transceiver, at a degraded level of performance, in response to said determining that the TTD value is greater than the MTTD.

8. The device of claim 6, wherein the processor and the memory are further configured to cause the device to:
determine that the TTD value is greater than a threshold maximum transmit timing difference (MTTD); and
transmit signals on a subset of the plurality of CCs using the transceiver while forgoing to transmit signals on one or more CCs other than the subset of CCs, in response to determining that the TTD value is greater than the MTTD.

9. The device of claim 8, wherein the MTTD is one of:
a first MTTD for intra-band EN-DC;
a second MTTD for inter-band EN-DC;
a third MTTD for intra-band NE-DC;
a fourth MTTD for inter-band NE-DC;
a fifth MTTD for intra-band NR-DC;
a sixth MTTD for inter-band NR-DC;
a seventh MTTD for intra-band NGEN-DC;
an eighth MTTD for inter-band NGEN-DC;
a ninth MTTD for intra-band CA; or
a tenth MTTD for inter-band CA.

10. The device of claim 6,
wherein determining the respective timing events corresponding to each of the plurality of CCs comprises determining a timing event for each of one or more TRPs utilizing the respective CC, based on one of a synchronization signal, a demodulation reference signal, a channel state information reference signal, a tracking reference signal, or other reference signal received from the respective TRP.

11. A non-transitory computer-readable medium storing computer-executable code, comprising code for causing a scheduled entity to:
transmit at least one respective uplink signal on each of a plurality of component carriers (CCs) using a transceiver;
determine respective timing events corresponding to each of the plurality of CCs, wherein the respective timing events are associated with the at least one respective uplink signal;
determine a reference time for a first CC of the plurality of CCs, the reference time corresponding to a function of two or more of the timing events corresponding to different transmission and reception points (TRPs) utilizing the first CC; and
generating a transmit timing difference (TTD) value between the plurality of CCs based on the determined reference time.

12. The non-transitory computer-readable medium of claim 11, wherein the code further causes the scheduled entity to:
determine that the TTD value is greater than a threshold maximum transmit timing difference (MTTD); and
transmit signals on the plurality of CCs, using the transceiver, at a degraded level of performance, in response to said determining that the TTD value is greater than the MTTD.

13. The non-transitory computer-readable medium of claim 11, wherein the code further causes the scheduled entity to:
determine that the TTD value is greater than a threshold maximum transmit timing difference (MTTD); and
transmit signals on a subset of the plurality of CCs using the transceiver while forgoing to transmit signals on one or more CCs other than the subset of CCs, in response to determining that the TTD value is greater than the MTTD.

14. The non-transitory computer-readable medium of claim 13, wherein the MTTD is one of:
a first MTTD for intra-band EN-DC;
a second MTTD for inter-band EN-DC;
a third MTTD for intra-band NE-DC;
a fourth MTTD for inter-band NE-DC;
a fifth MTTD for intra-band NR-DC;
a sixth MTTD for inter-band NR-DC;
a seventh MTTD for intra-band NGEN-DC;
an eighth MTTD for inter-band NGEN-DC;
a ninth MTTD for intra-band CA; or
a tenth MTTD for inter-band CA.

15. The non-transitory computer-readable medium of claim 11,
wherein determining the respective timing events corresponding to each of the plurality of CCs comprises determining a timing event for each of one or more TRPs utilizing the respective CC, based on one of a synchronization signal, a demodulation reference signal, a channel state information reference signal, a tracking reference signal, or other reference signal received from the respective TRP.

\* \* \* \* \*